US010296204B2

(12) United States Patent
Wei et al.

(10) Patent No.: US 10,296,204 B2
(45) Date of Patent: *May 21, 2019

(54) TOUCH OPERATION PROCESSING METHOD AND TERMINAL DEVICE

(71) Applicant: Huawei Device Co., Ltd., Dongguan (CN)

(72) Inventors: Huan Wei, Shenzhen (CN); Xuenan Zhang, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 123 days.

This patent is subject to a terminal disclaimer.

(21) Appl. No.: 14/996,004

(22) Filed: Jan. 14, 2016

(65) Prior Publication Data

US 2016/0132208 A1 May 12, 2016

Related U.S. Application Data

(63) Continuation of application No. 14/104,912, filed on Dec. 12, 2013, now Pat. No. 9,268,482, which is a (Continued)

(51) Int. Cl.
*G06F 3/041* (2006.01)
*G06F 3/0488* (2013.01)
(Continued)

(52) U.S. Cl.
CPC ............ *G06F 3/0488* (2013.01); *G06F 3/017* (2013.01); *G06F 3/04817* (2013.01);
(Continued)

(58) Field of Classification Search
CPC .... G06F 3/0488; G06F 3/04886; G06F 3/017; G06F 3/04842; G06F 3/0416;
(Continued)

(56) References Cited

U.S. PATENT DOCUMENTS 5,406,307 A 4/1995 Hirayama et al.
8,726,198 B2 * 5/2014 Rydenhag .............. G06F 3/017 345/173

(Continued)

FOREIGN PATENT DOCUMENTS

CN 102364428 A 2/2010
CN 101763194 A 6/2010

(Continued)

OTHER PUBLICATIONS

Foreign Communication From a Counterpart Application, European Application No. 12878211.7, Decision to refuse a European Patent Application dated Jul. 6, 2016, 24 pages.

(Continued)

*Primary Examiner* — Shen Shiau
(74) *Attorney, Agent, or Firm* — Conley Rose, P.C.

(57) ABSTRACT

A touch operation processing method and a terminal device. The method includes: detecting a touch operation of a user, which starts from a border of a screen display area to the screen display area, and using the first point touched by the touch operation in the screen display area as a starting point; and performing, according to the touch operation, reduction processing on an operation interface displayed in the screen display area, where one edge of an operation interface after the reduction processing includes the starting point. Therefore, the demand is met that the user triggers, by one hand, reduction processing on the operation interface and perform a selection operation on an arbitrary position in the entire screen display area of the terminal device when the user holds the terminal device with a large screen with one hand on it.

21 Claims, 7 Drawing Sheets

Related U.S. Application Data continuation of application No. PCT/CN2012/081495, filed on Sep. 17, 2012.

(51) Int. Cl.

*G06F 3/01* (2006.01)
*G06F 3/0484* (2013.01)
*G06F 3/0481* (2013.01)
*G06T 3/40* (2006.01)
*G06F 3/042* (2006.01)
*G06F 1/16* (2006.01)

(52) U.S. Cl.

CPC ...... *G06F 3/04842* (2013.01); *G06F 3/04886* (2013.01); *G06T 3/40* (2013.01); *G06F 1/1692* (2013.01); *G06F 3/0416* (2013.01); *G06F 3/0428* (2013.01); *G06F 2203/04806* (2013.01)

(58) Field of Classification Search

CPC ...... G06F 3/041; G06F 1/1692; G06F 3/0428; G05B 2219/36168

See application file for complete search history.

(56) References Cited

U.S. PATENT DOCUMENTS 8,760,557 B2 6/2014 Rydenhag et al.
8,769,431 B1* 7/2014 Prasad .................... G06F 3/048 715/764
8,869,059 B2* 10/2014 Aono .................. G06F 3/04886 715/773
9,529,490 B2* 12/2016 Li ......................... G06F 3/0481
2002/0167529 A1 11/2002 Kung
2009/0024956 A1* 1/2009 Kobayashi ............ G06F 3/0481 715/784
2009/0278816 A1 11/2009 Colson
2010/0020031 A1 1/2010 Hwang et al.
2010/0039400 A1 2/2010 Jang
2010/0060597 A1 3/2010 Choi et al.
2010/0111429 A1 5/2010 Wang et al.
2010/0241985 A1 9/2010 Kim et al.
2010/0302281 A1 12/2010 Kim
2010/0315438 A1 12/2010 Horodezky et al.
2011/0141145 A1 6/2011 Liang et al.
2011/0169749 A1* 7/2011 Ganey ................... G06F 1/1626 345/173
2011/0205163 A1* 8/2011 Hinckley .............. G06F 3/0483 345/173
2011/0209088 A1 8/2011 Hinckley et al.
2011/0242138 A1 10/2011 Tribble
2011/0246947 A1 10/2011 Hirohata et al.
2012/0047463 A1 2/2012 Park et al.
2012/0072847 A1 3/2012 Lee et al.
2012/0086652 A1 4/2012 Kim et al.
2012/0092381 A1 4/2012 Hoover et al.
2012/0169774 A1 7/2012 Yu
2012/0206363 A1 8/2012 Kyprianou et al.
2012/0236037 A1 9/2012 Lessing et al.
2012/0306788 A1* 12/2012 Chen ..................... G06F 3/0482 345/173
2013/0002585 A1 1/2013 Jee et al.
2013/0009903 A1 1/2013 Shiota
2013/0042203 A1* 2/2013 Wong .................... G06F 3/0488 715/800
2013/0088445 A1* 4/2013 Kang .................... G06F 3/0418 345/173
2013/0100061 A1 4/2013 Kawauchi
2013/0111334 A1 5/2013 Liang et al.
2013/0127750 A1 5/2013 Horiuchi et al.
2013/0152024 A1 6/2013 Liang et al.
2013/0241827 A1 9/2013 Ronkainen
2013/0275914 A1 10/2013 Zhuo
2013/0298076 A1* 11/2013 Rice ...................... G06F 3/0481 715/781
2014/0062919 A1 3/2014 Park
2014/0109022 A1* 4/2014 Wei ..................... G06F 3/04886 715/863
2014/0137036 A1* 5/2014 Han ...................... G06F 3/0482 715/798
2014/0137042 A1* 5/2014 Du ........................ G06F 3/0482 715/834
2014/0160073 A1* 6/2014 Matsuki ................ G06F 3/0485 345/174
2014/0164927 A1 6/2014 Salaverry et al.
2014/0181739 A1* 6/2014 Yoo ..................... G06F 3/04883 715/800
2014/0289642 A1* 9/2014 Prasad .................... G06F 3/048 715/745
2015/0046825 A1* 2/2015 Li ......................... G06F 3/0481 715/728
2015/0082237 A1 3/2015 Konishi et al.
2015/0084893 A1* 3/2015 Amagai .............. G06F 3/04883 345/173
2015/0185987 A1* 7/2015 Tsai .................... G06F 3/04817 715/798
2015/0205396 A1 7/2015 Konishi et al.
2015/0205507 A1* 7/2015 Chen ....................... G06F 3/048 715/800

FOREIGN PATENT DOCUMENTS

CN 101882055 A 11/2010
CN 101901107 A 12/2010
CN 101923438 A 12/2010
CN 102122230 A 7/2011
CN 102360249 A 2/2012
CN 102520860 A 6/2012
CN 102566908 A 7/2012
KR 20100128453 A 12/2010
KR 20120027516 A 3/2012
WO 2010144726 A1 12/2010
WO 2011135944 A1 11/2011

OTHER PUBLICATIONS

Partial English Translation and Abstract of Chinese Patent Application No. CN101882055, Jan. 17, 2014, 3 pages.

Partial English Translation and Abstract of Chinese Patent Application No. CN101923438, Jan. 17, 2014, 4 pages.

Office Action dated Mar. 10, 2014, 21 pages, U.S. Appl. No. 14/104,912, filed Dec. 12, 2013.

Office Action dated Sep. 18, 2014, 29 pages, U.S. Appl. No. 14/104,912, filed Dec. 12, 2013.

Notice of Allowance dated Oct. 16, 2015, 20 pages, U.S. Appl. No. 14/104,912, filed Dec. 12, 2013.

Foreign Communication From a Counterpart Application, European Application No. 12878211.7, Extended European Search Report dated Jun. 25, 2014, 7 pages.

Foreign Communication From a Counterpart Application, PCT Application No. PCT/CN2012/081495, English Translation of International Search Report dated Jun. 27, 2013, 2 pages.

Foreign Communication From a Counterpart Application, PCT Application No. PCT/CN2012/081495, English Translation of Written Opinion dated Jun. 27, 2013, 5 pages.

Foreign Communication From a Counterpart Application, Korean Application No. 10-2013-7033998, Korean Notice of Allowance dated Mar. 31, 2015, 3 pages.

Machine Translation and Abstract of Chinese Publication No. CN102360249, Feb. 22, 2012, 29 pages.

Foreign Communication From a Counterpart Application, Chinese Application No. 201610826074.X, Chinese Search Report dated Nov. 26, 2018, 2 pages.

* cited by examiner

TOUCH OPERATION PROCESSING METHOD AND TERMINAL DEVICE

CROSS-REFERENCE TO RELATED APPLICATIONS

This application is a continuation of U.S. patent application Ser. No. 14/104,912, filed on Dec. 12, 2013, which is a continuation of International Application No. PCT/CN2012/081495, filed on Sep. 17, 2012, which is hereby incorporated by reference in its entirety.

FILED OF THE DISCLOSURE

Embodiments of the present disclosure relate to communications technologies, and in particular, to a touch operation processing method and a terminal device.

BACKGROUND OF THE DISCLOSURE

With the rapid development of screen touch control technologies, a terminal device with a touch screen is widely applied. In addition, to improve user experience, a screen of a current terminal device, especially a mobile terminal, becomes increasingly large, so that a user can browse information through a large screen.

In the prior art, most users are accustomed to holding and operating this type of terminal device with a large screen with one hand. For example, the user may use one hand to hold the terminal device and use the thumb of this hand to tap a certain application client displayed in a screen display area, tap a video, or tap a web page link.

When a user holds and operates a terminal device with one hand, it is difficult for the user to perform an operation on an arbitrary position in the entire screen display area of the terminal device, and the user even cannot reach certain regions in the screen display area, thereby causing inconvenience to the operation of the user.

SUMMARY OF THE DISCLOSURE

Embodiments of the present disclosure provide a touch operation processing method and a terminal device.

A touch operation processing method provided by an embodiment of the present disclosure includes detecting a touch operation of a user, which starts from a border of a screen display area to the screen display area, and using the first point touched by the touch operation in the screen display area as a starting point; and performing, according to the touch operation, reduction processing on an operation interface displayed in the screen display area, where one edge of an operation interface after the reduction processing includes the starting point.

After performing, according to the touch operation, reduction processing on the operation interface displayed in the screen display area, the method also includes using content displayed at an end point position of the touch operation as selected content of the user.

Performing, according to the touch operation, reduction processing on the operation interface displayed in the screen display area includes performing, according to a track length of the touch operation, dynamic reduction processing on the operation interface displayed in the screen display area during the touch operation.

Performing, according to the touch operation, reduction processing on the operation interface displayed in the screen display area includes reducing the operation interface displayed in the screen display area to an operation interface of a fixed size according to the touch operation.

Performing reduction processing on the operation interface displayed in the screen display area includes performing reduction processing on the operation interface with the starting point as a fixed reference point if the starting point is in the range of a preset determination region, and if the starting point is not in the range of the preset determination region, performing reduction processing on the operation interface with an endpoint, which is an endpoint of the determination region and is close to the starting point, as the fixed reference point, where a part of the operation interface at a position of the fixed reference point maintains unchanged during the reduction processing.

Performing reduction processing on the operation interface displayed in the screen display area includes performing reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The method also includes restoring the operation interface after the reduction processing to the operation interface originally displayed in the screen display area.

Before detecting the touch operation of a user, which starts from a border of the screen display area to the screen display area, the method also includes receiving an input instruction of the user, and starting a border detecting function of the screen display area according to the input instruction.

A terminal device provided by an embodiment of the present disclosure includes: a detecting module configured to detect a touch operation of a user, which starts from a border of a screen display area to the screen display area, and use the first point touched by the touch operation in the screen display area as a starting point; and a processing module configured to perform, according to the touch operation, reduction processing on an operation interface displayed in the screen display area, where one edge of an operation interface after the reduction processing includes the starting point.

The terminal device also includes a selecting module configured to use content displayed at an end point position of the touch operation as selected content of the user.

The processing module is further configured to perform, according to a track length of the touch operation, dynamic reduction processing on the operation interface displayed in the screen display area during the touch operation.

The processing module is further configured to reduce the operation interface displayed in the screen display area to an operation interface of a fixed size according to the touch operation.

The processing module is further configured to, if the starting point is in the range of a preset determination region, perform reduction processing on the operation interface with the starting point as a fixed reference point, and if the starting point is not in the range of the preset determination region, perform reduction processing on the operation interface with an endpoint, which is an endpoint of the determination region and is close to the starting point, as the fixed reference point, where a part of the operation interface at a position of the fixed reference point maintains unchanged during the reduction processing.

The processing module is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The terminal device also includes a restoring module configured to restore the operation interface after the reduction processing to the operation interface originally displayed in the screen display area.

The detecting module is further configured to receive an input instruction of the user and start a border detecting function of the screen display area according to the input instruction.

A terminal device provided by an embodiment of the present disclosure includes a touch screen configured to detect a touch operation of a user, which starts from a border of a screen display area to the screen display area, and use the first point touched by the touch operation in the screen display area as a starting point; and a processor configured to perform, according to the touch operation, reduction processing on an operation interface displayed in the screen display area, where one edge of an operation interface after the reduction processing includes the starting point.

The touch screen is further configured to use content displayed at an end point position of the touch operation as selected content of the user.

The processor is further configured to perform, according to a track length of the touch operation, dynamic reduction processing on the operation interface displayed in the screen display area during the touch operation.

The processor is further configured to reduce the operation interface displayed in the screen display area to an operation interface of a fixed size according to the touch operation.

The processor is further configured to, if the starting point is in the range of a preset determination region, perform reduction processing on the operation interface with the starting point as a fixed reference point, and if the starting point is not in the range of the preset determination region, perform reduction processing on the operation interface with an endpoint, which is an endpoint of the determination region and is close to the starting point, as the fixed reference point, where a part of the operation interface at a position of the fixed reference point remains unchanged during the reduction processing.

The processor is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point remains unchanged during the reduction processing.

The processor is further configured to restore the operation interface after the reduction processing to the operation interface originally displayed in the screen display area.

The touch screen is further configured to receive an input instruction of the user and start a border detecting function of the screen display area according to the input instruction.

In the touch operation processing method and the terminal device provided by the embodiments of the present disclosure, by the touch operation that starts from a border of the screen display area to the screen display area, reduction processing is performed on the operation interface of the terminal device, and the demand can be met that the user triggers, by one hand, reduction processing on the operation interface and performs a selection operation on an arbitrary position in the entire screen display area of the terminal device when the user holds the terminal device with a large screen with one hand and performs operations.

BRIEF DESCRIPTION OF THE DRAWINGS

To describe the technical solutions in the embodiments of the present disclosure or in the prior art more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. The embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

Figure 1A:
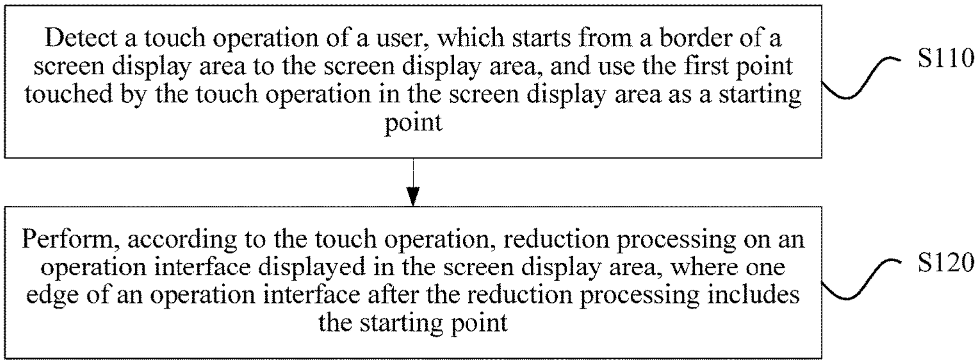
FIG. 1A is a flow chart of Embodiment 1 of a touch operation processing method provided by the present disclosure.

FIG. 1A is a flow chart of Embodiment 1 of a touch operation processing method provided by the present disclosure. As shown in FIG. 1A, the method in this embodiment may include the following steps.

Step S110: Detect a touch operation of a user, which starts from a border of a screen display area to the screen display area, and use the first point touched by the touch operation in the screen display area as a starting point.

A screen of a terminal device generally includes a display layer and a touch-sensitive layer that are superposed. The user obtains displayed content from the display layer and performs a touch operation on the terminal device through the touch-sensitive layer. The area of the touch-sensitive layer of the screen may be greater than that of the display layer of the screen. A display layer region of the screen of the terminal device is referred to as a screen display area, and a screen region other than the screen display area is referred as a border of the screen display area.

When a start position of the touch operation performed by the user on the terminal device is in the border of the screen display area of the terminal device and the touch operation slides into the screen display area of the terminal device from the border of the screen display area of the terminal device, the terminal device can detect and identify such a touch operation and define the first point touched by the touch operation in the screen display area as a starting point. The terminal device, for example, a mobile terminal device, may be a mobile phone, a tablet computer, or an E-book reader, which is not limited in the present disclosure.

Step S120: Perform, according to the touch operation, reduction processing on an operation interface displayed in the screen display area, where one edge of an operation interface after the reduction processing includes the starting point of the touch operation in the screen display area.

According to the touch operation detected in step S110, reduction processing is performed on the operation interface of an original size displayed in the screen display area. For example, according to factors such as the starting point or a sliding distance of the touch operation in the screen display area after the touch operation slides into the screen display area, reduction processing of different positions and proportions can be performed on the operation interface of an original size displayed in the screen display area, so as to obtain an operation interface having a smaller size and being suitable for an operation. The reduction processing may be equal proportion reduction or unequal proportion reduction, so as to obtain pictures of different proportions, such as a 16:9 picture or a 4:3 picture. The equal proportion reduction or the unequal proportion reduction is selected depending on a demand of the user, which is not limited in the embodiment of the present disclosure.

At least one edge of the operation interface after the reduction processing or an extension line of at least one edge of the operation interface after the reduction processing should include the starting point of the touch operation in the screen display area. That is, the operation interface after the reduction processing should closely contact the border from which the touch operation of the user starts, so that a finger of the same hand of the user, which initiates the touch operation, can reach an arbitrary position of the operation interface after the reduction processing.

In the touch operation processing method provided by this embodiment, the touch operation of the user, which starts from the border to the screen display area, is detected, and according to the touch operation, reduction processing is performed on the operation interface. The operation interface after the reduction processing is close to a position convenient for the user to perform a selection operation, and the demand can be met that the user triggers, by one hand, reduction processing on the operation interface and conveniently performs a selection operation on content at an arbitrary position in the entire screen display area of the terminal device when the user holds the terminal device with a large screen with one hand and performs an operation on it.

Figure 1B:
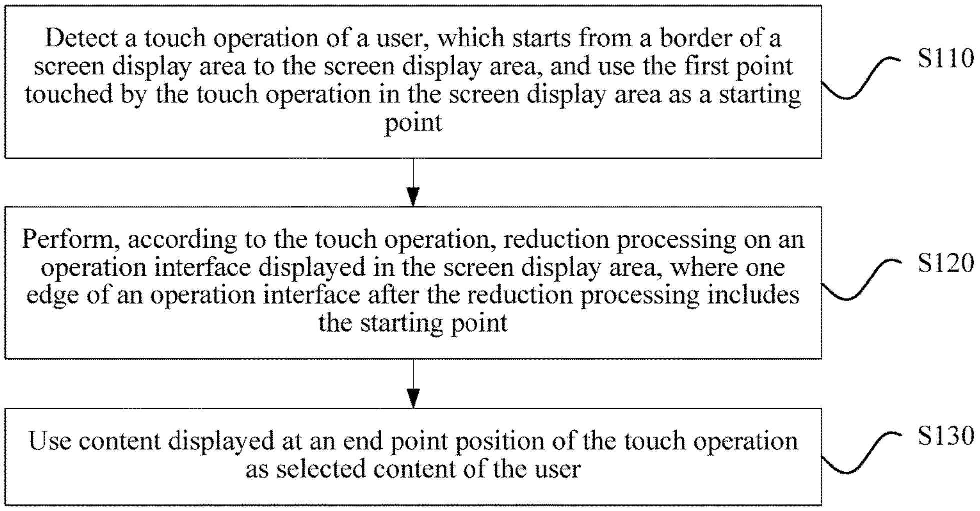
FIG. 1B is a flow chart of Embodiment 2 of a touch operation processing method provided by the present disclosure.

FIG. 1B is a flow chart of Embodiment 2 of a touch operation processing method provided by the present disclosure. As shown in FIG. 1B, the method in this embodiment may include the following steps.

Step S110: Detect a touch operation of a user, which starts from a border of a screen display area to the screen display area, and use the first point touched by the touch operation in the screen display area as a starting point.

A screen of a terminal device generally includes a display layer and a touch-sensitive layer that are superposed. The user obtains displayed content from the display layer and performs a touch operation on the terminal device through the touch-sensitive layer. The area of the touch-sensitive layer of the screen of the terminal device may be greater than that of the display layer. A display layer region of the screen of the terminal device is referred to as a screen display area, and a screen region other than the screen display area is referred to as a border of the screen display area.

When a start position of the touch operation performed by the user on the terminal device is in the border of the screen display area of the terminal device and the touch operation slides into the screen display area of the terminal device from the border of the screen display area of the terminal device, the terminal device can detect and identify such a touch operation and define the first point touched by the touch operation in the screen display area as a starting point. The terminal device, for example, a mobile terminal device, may be a mobile phone, a tablet computer, or an E-book reader, which is not limited in the present disclosure.

Step S120: Perform, according to the touch operation, reduction processing on an operation interface displayed in the screen display area, where one edge of an operation interface after the reduction processing includes the starting point of the touch operation in the screen display area.

According to the touch operation detected in step S110, reduction processing is performed on the operation interface of an original size displayed in the screen display area. For example, according to factors such as the starting point or a sliding distance of the touch operation in the screen display area after the touch operation slides into the screen display area, reduction processing of different positions and proportions can be performed on the operation interface of an original size displayed in the screen display area, so as to obtain an operation interface having a smaller size and being suitable for an operation. The reduction processing may be equal proportion reduction or unequal proportion reduction, so as to obtain pictures of different proportions, such as a 16:9 picture or a 4:3 picture. The equal proportion reduction or the unequal proportion reduction is selected depending on a demand of the user, which is not limited in the embodiment of the present disclosure.

At least one edge of the operation interface after the reduction processing, or an extension line of at least one edge of the operation interface after the reduction processing, should include the starting point of the touch operation in the screen display area. That is, the operation interface after the reduction processing should closely contact the border from which the touch operation of the user starts, so that a finger of the same hand of the user, which initiates the touch operation, can reach an arbitrary position of the operation interface after the reduction processing.

Step S130: Use content displayed at an end point position of the touch operation as selected content of the user.

The end point position at which the touch operation is finished is detected, and the content at the end point position, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

In the touch operation processing method provided by this embodiment, the touch operation of the user, which starts from the border to the screen display area, is detected, and according to the touch operation, reduction processing is performed on the operation interface. The operation interface after the reduction processing is close to a position convenient for the user to perform a selection operation, and the content displayed at the end point position of the touch operation is used as the selected content of the user, so that the demand can be met that the user triggers, by one hand, reduction processing on the operation interface and performs a selection operation on content at an arbitrary position in the entire screen display area of the terminal device when the user holds the terminal device with a large screen with one hand and performs an operation on it.

Figure 2:
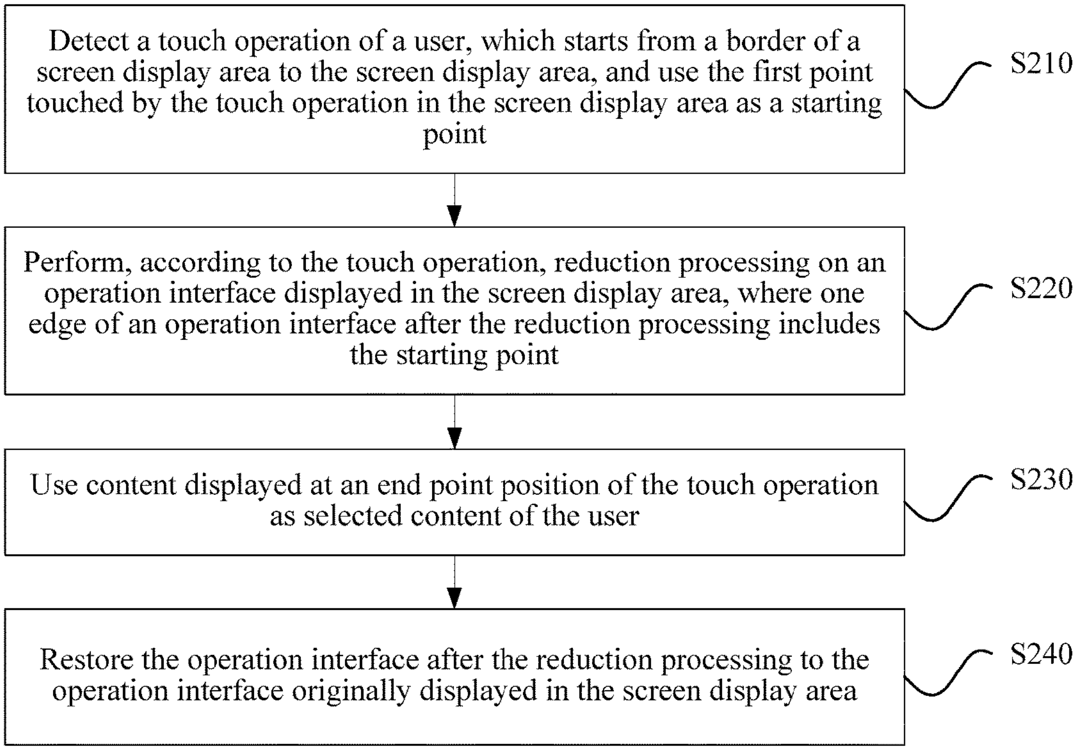
FIG. 2 is a flow chart of Embodiment 3 of a touch operation processing method provided by the present disclosure.

FIG. 2 is a flow chat of Embodiment 3 of a touch operation processing method provided by the present disclosure. As shown in FIG. 2, the difference between this embodiment and the embodiments in FIG. 1A and FIG. 1B lies in that after the content displayed at the end point position of the touch operation is used as the selected content of the user, a step of restoring the operation interface after the reduction processing to the operation interface originally displayed in the screen display area may further be included. The method in this embodiment may include the following steps.

Step S210: Detect a touch operation of a user, which starts from a border of a screen display area to the screen display area, and use the first point touched by the touch operation in the screen display area as a starting point.

A screen of a terminal device generally includes a display layer and a touch-sensitive layer that are superposed. The user obtains displayed content from the display layer and performs a touch operation on the terminal device through the touch-sensitive layer. The area of the touch-sensitive layer of the screen of the terminal device may be greater than that of the display layer. A display layer region of the screen of the terminal device is referred to as a screen display area, and a screen region other than the screen display area is referred to as a border of the screen display area.

When a start position of the touch operation performed by the user on the terminal device is in the border of the screen display area of the terminal device and the touch operation slides into the screen display area of the terminal device from the border of the screen display area of the terminal device, the terminal device can detect and identify such a touch operation. The terminal device, for example, a mobile terminal device, may be a mobile phone, a tablet computer, or an E-book reader.

Step S220: Perform, according to the touch operation, reduction processing on an operation interface displayed in the screen display area, where one edge of an operation interface after the reduction processing includes the starting point of the touch operation in the screen display area.

According to the touch operation detected in step S210, reduction processing is performed on the operation interface of an original size displayed in the screen display area. For example, according to factors such as the starting point or a sliding distance of the touch operation in the screen display area after the touch operation slides into the screen display area, reduction processing of different positions and proportions can be performed on the operation interface of an original size displayed in the screen display area, so as to obtain an operation interface having a smaller size and being suitable for an operation. The reduction processing may be equal proportion reduction or unequal proportion reduction, so as to obtain pictures of different proportions, such as a 16:9 picture or a 4:3 picture. The equal proportion reduction or the unequal proportion reduction is selected depending on a demand of the user, which is not limited in the embodiment of the present disclosure.

At least one edge of the operation interface after the reduction processing or an extension line of at least one edge of the operation interface after the reduction processing should include the starting point of the touch operation in the screen display area. That is, the operation interface after the reduction processing should closely contact the border from which the touch operation of the user starts, so that a finger of the same hand of the user, which initiates the touch operation, can reach an arbitrary position of the operation interface after the reduction processing.

Step S230: Use content displayed at an end point position of the touch operation as selected content of the user.

The end point position at which the touch operation is finished is detected, and the content at the end point position, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

Step S240: Restore the operation interface after the reduction processing to the operation interface originally displayed in the screen display area.

After the finger of the user leaves the screen display area, that is, after a selection operation on the selected content is completed, the operation interface after the reduction processing can be automatically restored to the operation interface originally displayed in the screen display area. Of course, the operation interface after the reduction processing may also be restored to the operation interface originally displayed in the screen display area by using methods such as pressing a button of the terminal device or tapping the screen. The method of triggering step S240 is not limited in the embodiment of the present disclosure.

In the touch operation processing method provided by this embodiment, the touch operation of the user, which starts from the border to the screen display area, is detected, and according to the touch operation, reduction processing is performed on the operation interface. The operation interface after the reduction processing is close to a position convenient for the user to perform a selection operation, and the content displayed at the end point position of the touch operation is used as the selected content of the user. After the selection operation is completed, the size of the operation interface is restored. The demand can be met that the user triggers, by one hand, reduction processing on the operation interface, performs a selection operation on content at an arbitrary position in the entire screen display area of the terminal device, and after completing the selection operation, restores the operation interface when the user holds the terminal device with a large screen with one hand and performs an operation on it.

In the method embodiment shown in any one of FIG. 1A to FIG. 2, the performing, according to the touch operation, reduction processing on the operation interface displayed in the screen display area may include performing, according to a track length of the touch operation, dynamic reduction processing on the operation interface displayed in the screen display area during the touch operation. It is assumed that the correspondence between a track length L of a touch operation performed by the user on a 5.5-inch screen display area and a reduction size S is preset as follows: the operation interface displayed in the screen display area is reduced by 0.2 inch for each 1 millimeter that the track length L is increased by. Accordingly, when the track length L of the touch operation performed by the user on the screen display area is 1 centimeter, the 5.5-inch screen display area is reduced to a screen display area of a 3.5-inch size. Of course, the correspondence between the track length L and the reduction size S is not limited thereto, and can be flexibly adjusted according to factors such as the size of the screen display area of the terminal device. A size limit may also be specified for the size of the operation interface after reduction processing. For example, the size of the operation interface after reduction processing is not less than 2.5 inches, so as to avoid the situation that the operation interface is so small that the user cannot identify content to be operated or the user performs a misoperation; or reducing the operation interface displayed in the screen display area to an operation interface of a fixed size according to the touch operation. Once the touch operation of the user enters the screen display area of the terminal device, and when it is assumed that the size of the screen display area is 5.5 inches and a value of the track length L of the touch operation is greater than zero, the operation interface displayed in the screen display area is reduced to an operation interface of a preset fixed size. For example, the operation interface displayed in the screen display area is reduced to a preset 3.5-inch operation interface. Of course, the size of the preset operation interface after reduction processing is not limited thereto, and may be flexibly adjusted according to factors such as the size of the screen display area of the terminal device or a user preference.

In the touch operation processing method provided by this embodiment, the touch operation of the user, which starts from the border to the screen display area, is detected, and according to the track length of the touch operation, the operation interface is reduced to an operation interface of a corresponding size. The operation interface after the reduction processing is close to a position convenient for the user to perform a selection operation, and the content displayed at the end point position of the touch operation can be used as the selected content of the user for the selection operation. The demand can be met that the user triggers, by one hand, reduction processing on the operation interface and conveniently and accurately performs a selection operation on content at an arbitrary position in the entire screen display area of the terminal device when the user holds the terminal device with a large screen with one hand and performs an operation on it.

The technical solution of any one of the method embodiments in FIG. 1A to FIG. 2 is described in detail below with several specific embodiments.

Figure 3A:
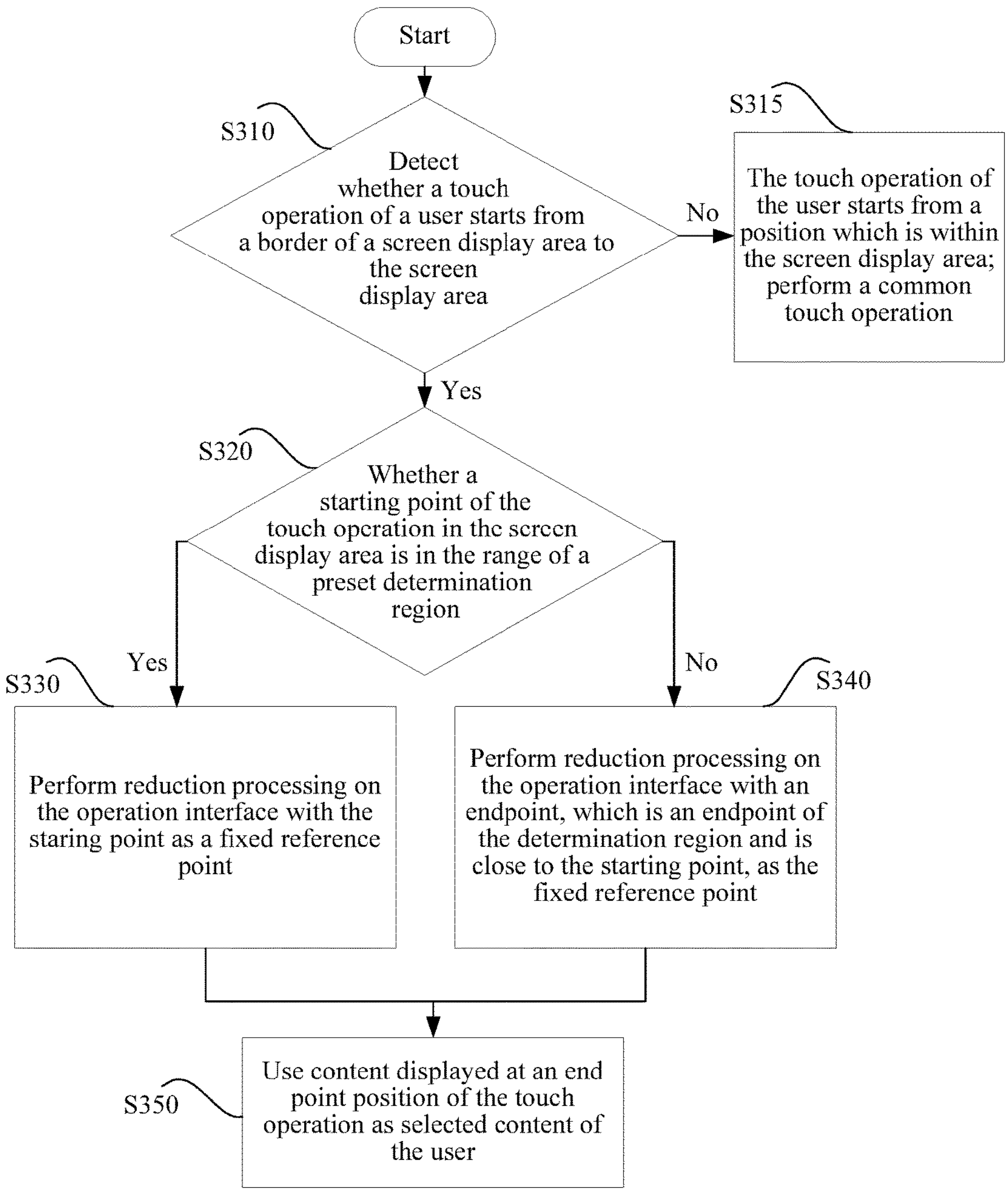
FIG. 3A is a flow chart of Embodiment 4 of a touch operation processing method provided by the present disclosure.

FIG. 3A is a flow chart of Embodiment 4 of a touch operation processing method provided by the present disclosure. As shown in FIG. 3A, in the touch operation processing method provided by this embodiment, performing reduction processing on an operation interface displayed in a screen display area may include: performing reduction processing on the operation interface with the starting point as a fixed reference point if a starting point is in the range of a preset determination region; if the starting point is not in the range of the preset determination region, performing reduction processing on the operation interface with an endpoint, which is an endpoint of the determination region and is close to the starting point, as the fixed reference point, where a part of the operation interface at a position of the fixed reference point remains unchanged during the reduction processing. The method in this embodiment may include the following steps.

Step S310: Detect whether a touch operation of a user starts from a border of a screen display area to the screen display area, if the touch operation of the user does not start from a border of the screen display area to the screen display area, but starts from a position which is within the screen display area, perform a common touch operation (step S315); if the touch operation of the user starts from a border of the screen display area to the screen display area, perform step S320.

Before step S310 of detecting whether the touch operation of the user starts from a border of the screen display area to the screen display area, an input instruction of the user may firstly be received. A border detecting function of the screen display area is started according to the input instruction, so as to avoid the situation that the processing method provided by the embodiment of the present disclosure is started by mistake when the user does not need to perform reduction processing on the operation interface. The input instruction of the user may be in the form of starting the border detecting function by presetting or in other forms, which is not limited in the embodiment of the present disclosure.

Step S320: Determine whether a starting point of the touch operation in the screen display area is in the range of a preset determination region, if the starting point is in the range of the preset determination region, perform reduction processing on the operation interface with the starting point as a fixed reference point (step S330); if the starting point is not in the range of the preset determination region, perform reduction processing on the operation interface with an endpoint, which is an endpoint of the determination region and is close to the starting point, as the fixed reference point (step S340), where a part of the operation interface at a position of the fixed reference point remains unchanged during the reduction processing.

Figure 3B:
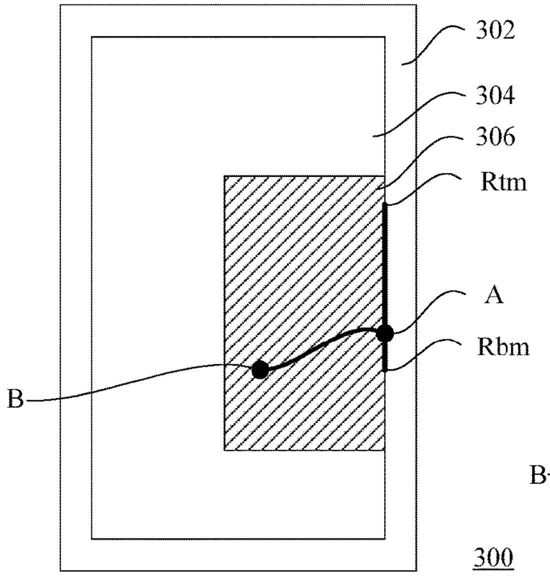
FIG. 3B is a first exemplary diagram of the touch operation processing method in FIG. 3A.

For step S330, FIG. 3B is a first exemplary diagram of the touch operation processing method in FIG. 3A. As shown in FIG. 3B, a terminal device 300 detects that the touch operation of the user starts from a border of the screen display area, for example, from a right border 302 of the screen display area, and the touch operation enters the screen display area 304 from a starting point A in the screen display area 304. It is determined whether the starting point A of the touch operation in the screen display area 304 when the touch operation enters the screen display area 304 is in a preset determination region Rbm-Rtm, the preset determination region Rbm-Rtm is a line which connected Rbm with Rtm, where Rbm is an lower endpoint of the determination region Rbm-Rtm, and Rtm is a upper endpoint of the determination region Rbm-Rtm. If the starting point A is in the preset determination region Rbm-Rtm, then, as shown in FIG. 3B, reduction processing is performed on the operation interface with the starting point A as the fixed reference point. During the reduction processing, a part of the operation interface at a position of the fixed reference point, that is, the starting point A, maintains unchanged. One edge of an operation interface 306 after the reduction processing includes the starting point A. That is, the operation interface 306 after the reduction processing closely contacts the right border 302 of the screen display area, from which the touch operation of the user starts, so that a finger of the same hand (for example, the right hand) of the user, which initiates the touch operation, conveniently operates on an arbitrary position in the operation interface after the reduction processing.

Figure 3C:
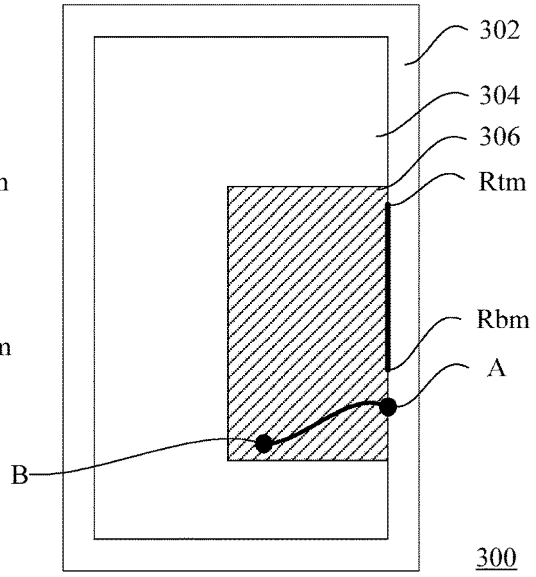
FIG. 3C is a second exemplary diagram of the touch operation processing method in FIG. 3A.

For the step S340, FIG. 3C is a second exemplary diagram of the touch operation processing method in FIG. 3A. As shown in FIG. 3C, a terminal device 300 detects that the touch operation of the user starts from a border of the screen display area, for example, from a right border 302 of the screen display area, and the touch operation enters the screen display area 304 from a starting point A in the screen display area 304. It is determined whether the starting point A of the touch operation in the screen display area 304 when the touch operation enters the screen display area 304 is in a preset determination region Rbm-Rtm, where Rbm is a lower endpoint of the determination region Rbm-Rtm, and Rtm is an upper endpoint of the determination region Rbm-Rtm. If the starting point A is not in the preset determination region Rbm-Rtm, then, as shown in FIG. 3C, reduction processing is performed on the operation interface with an endpoint, which is an endpoint of the determination region and is close to the starting point A, that is, the lower endpoint Rbm of the determination region, as a fixed reference point. During the reduction processing, a part of the operation interface at a position of the fixed reference point, that is, the lower endpoint Rbm, remains unchanged. One edge of an operation interface 306 after the reduction processing includes the starting point A. That is, the operation interface 306 after the reduction processing closely contacts the right border 302 of the screen display area, from which the touch operation of the user starts, so that a finger of the same hand (for example, the right hand) of the user, which initiates the touch operation, conveniently operates on an arbitrary position in the operation interface after the reduction processing.

Step S350: Use content displayed at an end point position of the touch operation as selected content of the user. Referring to FIG. 3A to FIG. 3C, after reduction processing is performed on the operation interface, an end point position B of the touch operation is detected, and the content displayed at the end point position B, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

After the selection operation is completed, the operation interface 306 after the reduction processing may also be restored to the operation interface originally displayed in the screen display area 304. After the finger of the user leaves the screen display area 304, that is, after the selection operation on the selected content is completed, the operation interface 306 after the reduction processing can be automatically restored to the operation interface originally displayed in the screen display area 304. Of course, the operation interface 306 after the reduction processing may also be restored to the operation interface originally displayed in the screen display area 304 by using methods such as pressing a button (not shown) of the terminal device 300 or tapping the screen. The method of triggering the restoring of the operation interface is not limited in the embodiment of the present disclosure.

In the touch operation processing method provided by this embodiment, the touch operation of the user, which starts from the border to the screen display area, is detected, and according to the starting point position and the displacement of the touch operation in the screen display area, the operation interface is reduced to an operation interface of a corresponding size at a corresponding position. The content displayed at the end point position of the touch operation is used as the selected content of the user, and after the selection operation is completed, the size of the operation interface may be restored. The demand can be met that the user triggers, by one hand, reduction processing on the operation interface and conveniently and accurately performs a selection operation on content at an arbitrary position in the entire screen display area of the terminal device when the user holds the terminal device with a large screen with one hand and performs an operation on it.

Figure 4A:
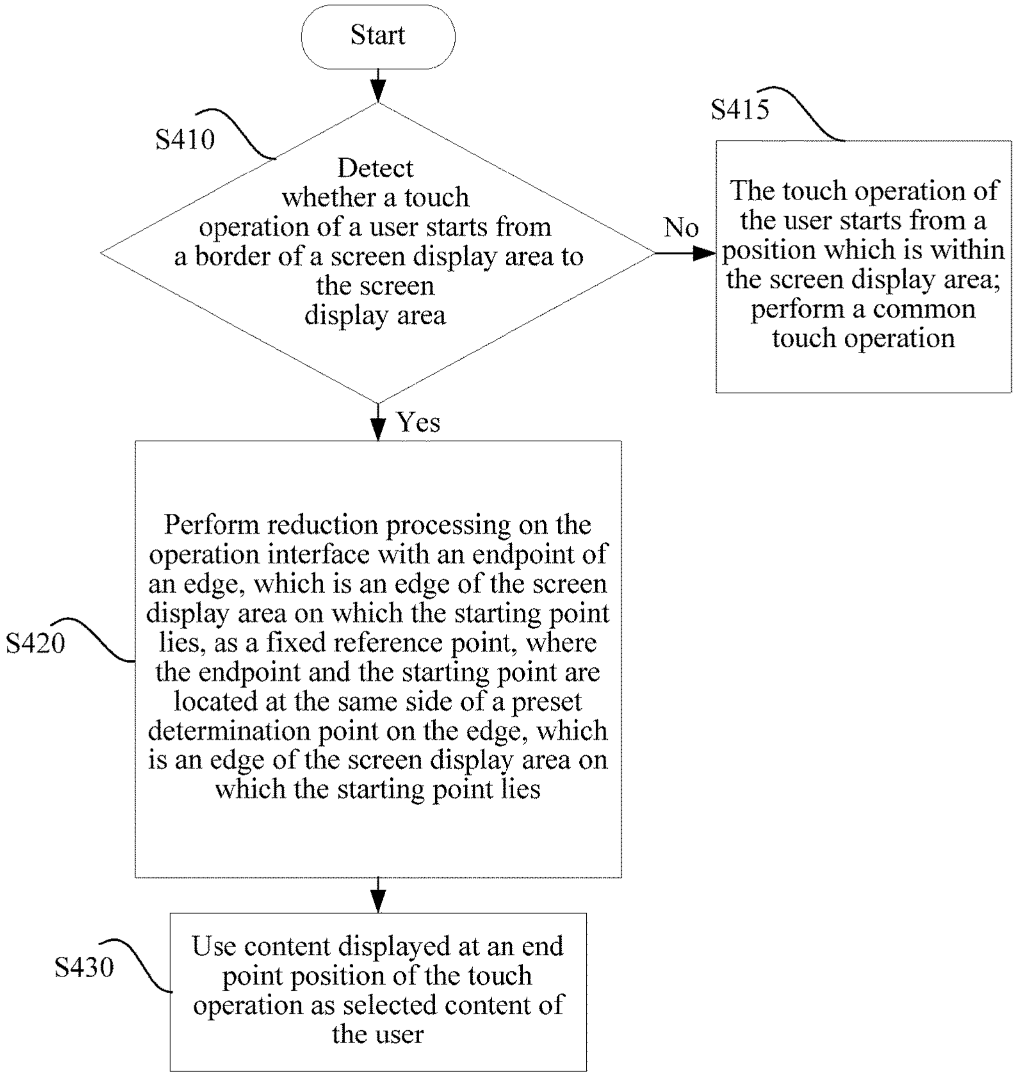
FIG. 4A is a flow chart of Embodiment 5 of a touch operation processing method provided by the present disclosure.

FIG. 4A is a flow chart of Embodiment 5 of a touch operation processing method provided by the present disclosure. As shown in FIG. 4A, in the touch operation processing method provided by this embodiment, performing reduction processing on an operation interface displayed in a screen display area may include: performing reduction processing on the operation interface with an endpoint of an edge, which is an edge of the screen display area on which a starting point lies, as a fixed reference point, where the endpoint and the starting point are located at the same side of a preset determination point on the edge, which is an edge of the screen display area on which the starting point lies, and a part of the operation interface at a position of the fixed reference point remains unchanged during the reduction processing. The method in this embodiment may specifically include the following steps.

Step S410: Detect whether a touch operation of a user starts from a border of a screen display area to the screen display area, if the touch operation of the user does not start from a border of the screen display area to the screen display area, but starts from a position which is within the screen display area, perform a common touch operation (step S415); if the touch operation of the user starts from a border of the screen display area to the screen display area, perform step S420.

Before the step S410 of detecting whether the touch operation of the user starts from a border of the screen display area to the screen display area, an input instruction of the user may firstly be received. A border detecting function of the screen display area is started according to the input instruction, so as to avoid the situation that the processing method provided by the embodiment of the present disclosure is started by mistake when the user does not need to perform reduction processing on the operation interface. The input instruction of the user may be in the form of starting the border detecting function by presetting or in other forms, which is not limited in the embodiment of the present disclosure.

Step S420: Perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

Figure 4B:
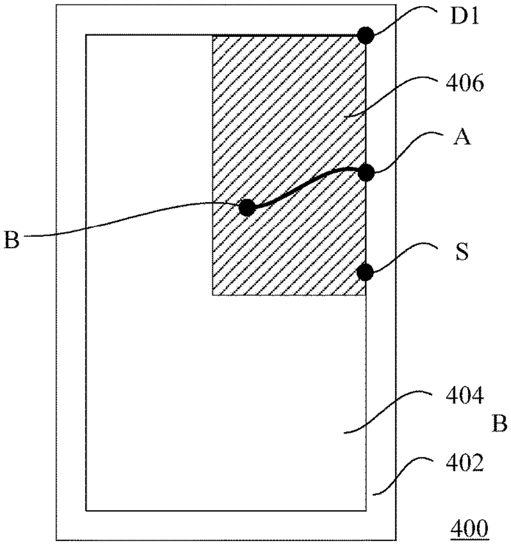
FIG. 4B is a first exemplary diagram of the touch operation processing method in FIG. 4A.

FIG. 4B is a first exemplary diagram of the touch operation processing method in FIG. 4A. As shown in FIG. 4B, a terminal device 400 detects that the touch operation of the user starts from a border of the screen display area, for example, from a right border 402 of the screen display area, and the touch operation enters the screen display area 404 from a starting point A in the screen display area 404. It is determined which side of a determination point S on a border, which is a border of the screen display area on which the starting point A lies, the starting point A in the screen display area 404 when the touch operation enters the screen display area 404 is located. If the starting point A is located above the preset determination point S, then, as shown in FIG. 4B, reduction processing is performed on the operation interface with an upper endpoint D1 of the border, which is a border of the screen display area on which the starting point A lies, as the fixed reference point. One edge of an operation interface 406 after the reduction processing includes the starting point A. That is, the operation interface 406 after the reduction processing closely contacts the right border 402 of the screen display area, from which the touch operation of the user starts, so that a finger of the same hand of the user, which initiates the touch operation, conveniently operates on an arbitrary position of the operation interface after the reduction processing.

Figure 4C:
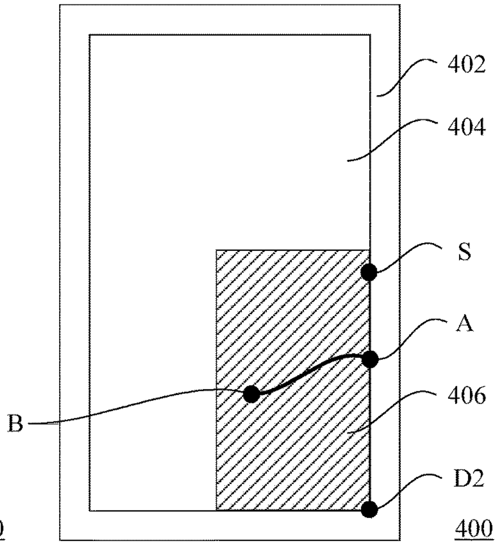
FIG. 4C is a second exemplary diagram of the touch operation processing method in FIG. 4A.

Step S430: Use content displayed at an end point position of the touch operation as selected content of the user. Referring to FIG. 4A to FIG. 4C, after reduction processing is performed on the operation interface, an end point position B of the touch operation is detected, and the content displayed at the end point position B, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

After the selection operation is completed, the operation interface 406 after the reduction processing may also be restored to the operation interface originally displayed in the screen display area 404. After the finger of the user leaves the screen display area 404, that is, after the selection operation on the selected content is completed, the operation interface 406 after the reduction processing can be automatically restored to the operation interface originally displayed in the screen display area 404. Of course, the operation interface 406 after the reduction processing may also be restored to the operation interface originally displayed in the screen display area 404 by using methods such as pressing a button (not shown) of the terminal device 400 or tapping the screen. The method of triggering the restoring of the operation interface is not limited in the embodiment of the present disclosure.

In the touch operation processing method provided by this embodiment, the touch operation of the user, which starts from the border to the screen display area, is detected, and according to the starting point position and the displacement of the touch operation in the screen display area, the operation interface is reduced to an operation interface of a corresponding size at a corresponding position. The content displayed at the end point position of the touch operation may be used as the selected content of the user to perform a selection operation, and after the selection operation is completed, the size of the operation interface may be restored. The demand can be met that the user triggers, by one hand, reduction processing on the operation interface and conveniently and accurately performs a selection operation on content at an arbitrary position in the entire screen display area of the terminal device when the user holds the terminal device with a large screen with one hand and performs an operation on it.

Figure 5A:
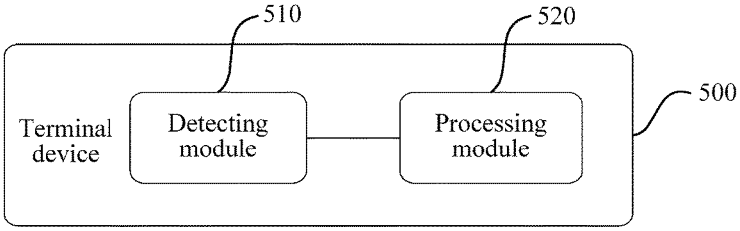
FIG. 5A is a schematic structural diagram of Embodiment 1 of a terminal device provided by the present disclosure.

FIG. 5A is a schematic structural diagram of Embodiment 1 of a terminal device provided by the present disclosure. As shown in FIG. 5A, a terminal device 500 in this embodiment may include a detecting module 510 and a processing module 520. The detecting module 510 is configured to detect a touch operation of a user, which starts from a border of a screen display area to the screen display area, and use the first point touched by the touch operation in the screen display area as a starting point. The processing module 520 is configured to perform, according to the touch operation, reduction processing on an operation interface displayed in the screen display area, where one edge of an operation interface after the reduction processing includes the starting point.

The terminal device in this embodiment may be configured to execute the technical solution of the method embodiment shown in FIG. 1A, and its implementation principle and technical effect are similar to those of the method embodiment shown in FIG. 1A, which are not described herein again.

Figure 5B:
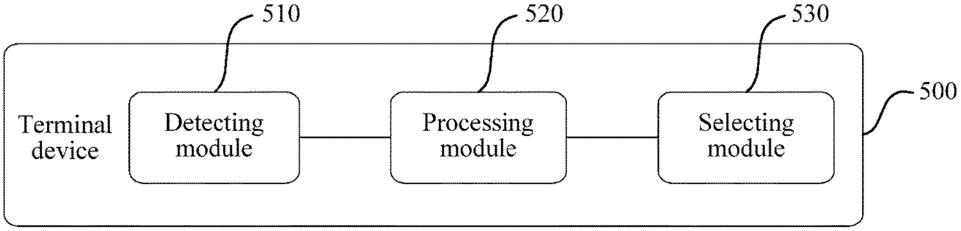
FIG. 5B is a schematic structural diagram of Embodiment 2 of a terminal device provided by the present disclosure.

FIG. 5B is a schematic structural diagram of Embodiment 2 of a terminal device provided by the present disclosure. As shown in FIG. 5B, a terminal device 500 in this embodiment may include a detecting module 510, a processing module 520, and a selecting module 530. The detecting module 510 is configured to detect a touch operation of a user, which starts from a border of a screen display area to the screen display area, and use the first point touched by the touch operation in the screen display area as a starting point. The processing module 520 is configured to perform, according to the touch operation, reduction processing on an operation interface displayed in the screen display area, where one edge of an operation interface after the reduction processing includes the starting point. The selecting module 530 is configured to use content displayed at an end point position of the touch operation as selected content of the user.

The terminal device in this embodiment may be configured to execute the technical solution of the method embodiment shown in FIG. 1B, and its implementation principle and the technical effect are similar to those of the method embodiment shown in FIG. 1B, which are not described herein again.

Figure 6:
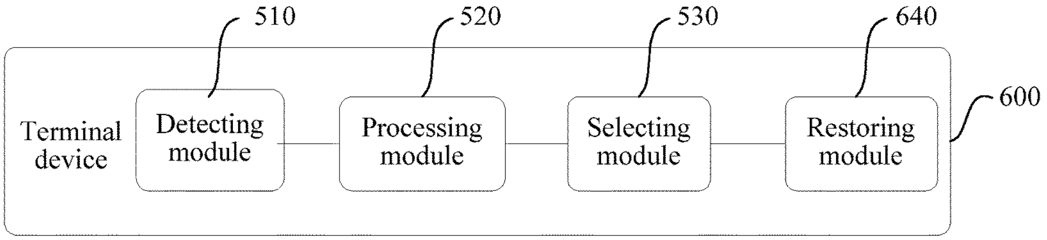
FIG. 6 is a schematic structural diagram of Embodiment 3 of a terminal device provided by the present disclosure.

FIG. 6 is a schematic structural diagram of Embodiment 3 of a terminal device provided by the present disclosure. As shown in FIG. 6, based on the apparatus structure shown in FIG. 5B, a terminal device 600 in this embodiment may further include a restoring module 640. The restoring module 640 is configured to restore an operation interface after the reduction processing to the operation interface originally displayed in the screen display area.

The terminal device in this embodiment may be configured to execute the technical solution of the method embodiment shown in FIG. 2, and its implementation principle and the technical effect are similar to those of the method embodiment shown in FIG. 2, which are not described herein again.

In the embodiment of the terminal device shown in any one of FIG. 5A to FIG. 6, the processing module 520 is further configured to perform, according to a track length of the touch operation, dynamic reduction processing on the operation interface displayed in the screen display area during the touch operation. Or, the processing module 520 is further configured to reduce the operation interface displayed in the screen display area to an operation interface of a fixed size according to the touch operation. Its implementation principle and the technical effect are similar to those in the method embodiment, which are not described herein again.

In the embodiment of the terminal device shown in any one of FIG. 5A to FIG. 6, the detecting module 510 is further configured to receive an input instruction of the user and start a border detecting function of the screen display area according to the input instruction. The processing module 520 is further configured to, if the starting point is in the range of a preset determination region, perform reduction processing on the operation interface with the starting point as a fixed reference point, and if the starting point is not in the range of the preset determination region, perform reduction processing on the operation interface with an endpoint, which is an endpoint of the determination region and is close to the starting point, as the fixed reference point, where a part of the operation interface at a position of the fixed reference point maintains unchanged during the reduction processing.

The terminal device in this embodiment may be configured to execute the technical solution of the method embodiment shown in any one of FIG. 3A to FIG. 3C, and its implementation principle and the technical effect are similar to those of the method embodiment shown in any one of FIG. 3A to FIG. 3C, which are not described herein again.

In the embodiment of the terminal device shown in any one of FIG. 5A to FIG. 6, the detecting module 510 is further configured to receive an input instruction of the user and start a border detecting function of the screen display area according to the input instruction. The processing module 520 is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The terminal device in this embodiment may be configured to execute the technical solution of the method embodiment shown in any one of FIG. 4A to FIG. 4C, and its implementation principle and the technical effect are similar to those of the method embodiment shown in any one of FIG. 4A to FIG. 4C, which are not described herein again.

Figure 7:
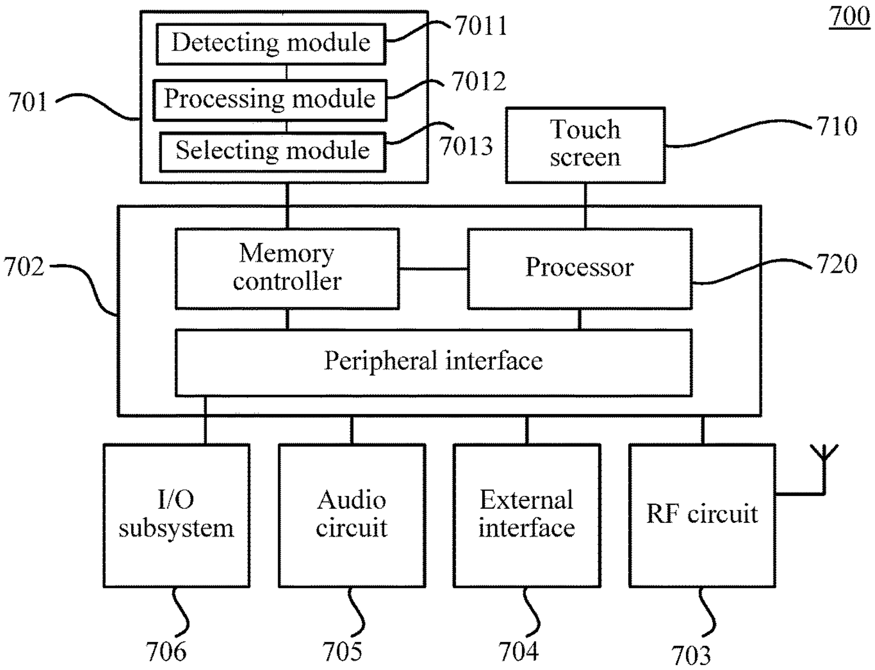
FIG. 7 is a schematic structural diagram of Embodiment 4 of a terminal device provided by the present disclosure.

FIG. 7 is a schematic structural diagram of Embodiment 4 of a terminal device provided by the present disclosure. As shown in FIG. 7, a terminal device 700 provided by this embodiment includes a memory 701, a chip 702, a radio frequency (RF) circuit 703, an external interface 704, an audio circuit 705, an input/output (I/O) subsystem 706, and a touch screen 710. The chip 702 includes a processor 720, a memory controller, a central processing unit (CPU), and a peripheral interface. The memory 701 includes a detecting module 7011, a processing module 7012, a selecting module 7013, and other functional modules, such as an operating system.

The components communicate through one or more communication buses or signal lines. The terminal device 700 may include, but is not limited to, a mobile phone or a tablet computer. Each of the components shown in FIG. 7 may be implemented through hardware, software or a combination of hardware and software, including one or more signal processing and/or application-specific integrated circuits. The memory 701 may include a high-speed random access memory, and a non-volatile solid-state storage device. The memory controller may control access of other components of the terminal device 700, such as the CPU and the peripheral interface, to the memory 701, so as to invoke each module in the memory 701 to perform a corresponding function.

The touch screen 710 is configured to detect a touch operation of a user, which starts from a border of a screen display area to the screen display area, and use the first point touched by the touch operation in the screen display area as a starting point. The processor 720 is configured to perform, according to the touch operation, reduction processing on an operation interface displayed in the screen display area, where one edge of an operation interface after the reduction processing includes the starting point.

The terminal device in this embodiment may be configured to execute the technical solution of the method embodiment shown in FIG. 1A, and its implementation principle and the technical effect are similar to those of the method embodiment shown in FIG. 1A, which are not described herein again.

Further, the touch screen 710 is further configured to use content displayed at an end point position of the touch operation as selected content of the user.

The terminal device in this embodiment may be configured to execute the technical solution of the method embodiment shown in FIG. 1B, and its implementation principle and the technical effect are similar to those of the method embodiment shown in FIG. 1B, which are not described herein again.

Further, the processor 720 is further configured to restore the operation interface after the reduction processing to the operation interface originally displayed in the screen display area.

The terminal device in this embodiment may be configured to execute the technical solution of the method embodiment shown in FIG. 2, and its implementation principle and the technical effect are similar to those of the method embodiment shown in FIG. 2, which are not described herein again.

In the embodiment of the terminal device shown in FIG. 7, the processor 720 is further configured to perform, according to a track length of the displacement along which the touch operation slides, dynamic reduction processing on the operation interface displayed in the screen display area during the touch operation. Or, the processor 720 is further configured to reduce the operation interface displayed in the screen display area to an operation interface of a fixed size according to the touch operation. Its implementation principle and the technical effect are similar to those in the method embodiment, which are not described herein again.

In the embodiment of the terminal device shown in FIG. 7, the touch screen 710 is further configured to receive an input instruction of the user and start a border detecting function of the screen display area according to the input instruction. The processor 720 is further configured to, if the starting point is in the range of a preset determination region, perform reduction processing on the operation interface with the starting point as a fixed reference point; if the starting point is not in the range of the preset determination region, perform reduction processing on the operation interface with an endpoint, which is an endpoint of the determination region and is close to the starting point, as the fixed reference point, where a part of the operation interface at a position of the fixed reference point maintains unchanged during the reduction processing.

The terminal device in this embodiment may be configured to execute the technical solution of the method embodiment shown in any one of FIG. 3A to FIG. 3C, and its implementation principle and the technical effect are similar to those of the method embodiment shown in any one of FIG. 3A to FIG. 3C, which are not described herein again.

In the embodiment of the terminal device shown in FIG. 7, the touch screen 710 is further configured to receive an input instruction of the user and start a border detecting function of the screen display area according to the input instruction. The processor 720 is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The terminal device in this embodiment may be configured to execute the technical solution of the method embodiment shown in any one of FIG. 4A to FIG. 4C, and its implementation principle and the technical effect are similar to those of the method embodiment shown in any one of FIG. 4A to FIG. 4C, which are not described herein again.

Persons of ordinary skill in the art may understand that all or part of the steps of the methods in the embodiments may be implemented by a program instructing relevant hardware. The program may be stored in a computer readable storage medium. When the program is run, the foregoing steps of the method embodiments are performed. The storage medium may be any medium capable of storing program codes, such as read only memory (ROM), random access memory (RAM), magnetic disk, or optical disk.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof; without departing from the idea and scope of the technical solutions of the embodiments of the present disclosure.

What is claimed is:

1. A gesture processing method implemented by a terminal device, comprising:

detecting a sliding gesture on a touch-sensitive screen of the terminal device, the sliding gesture starting from a non-display area of the touch-sensitive screen and extending to a display area of the touch-sensitive screen, the display area being configured to display an operation interface, the non-display area not being configured to display the operation interface, the non-display area sharing a common border with the display area, and the sliding gesture crossing the common border at a display area entry point; and dynamically scaling the operation interface displayed in the display area down to a scaled operation interface according to a track length of a sliding distance of the sliding gesture, one edge of the scaled operation interface contacting the common border, and the edge of the scaled operation interface comprising the display area entry point.

2. The method of claim 1, further comprising:

detecting an end point position of the sliding gesture; and performing selection operation on content displayed at the end point position in the display area in response to the detecting the end point position of the sliding gesture.

3. The method of claim 2, further comprising:

detecting completion of the selection operation; and scaling the scaled operation interface back to the operation interface in response to detecting completion of the selection operation.

4. The method of claim 3, wherein the content displayed at the end point position in the displayed area is an icon of an application.

5. The method of claim 3, wherein the content displayed at the end point position in the displayed area is a hyperlink address.

6. The method of claim 3, wherein the content displayed at the end point position in the displayed area is a button.

7. The method of claim 3, wherein the selection operation is tapping.

8. The method of claim 3, wherein the selection operation is double tapping.

9. The method of claim 1, wherein the non-display area shares another common border with the display area, and another edge of the scaled operation interface contacts the other common border.

10. A terminal device, comprising:

a display;

one or more processors coupled to the display; and a memory coupled to the one or more processors and storing programming for execution by the one or more processors, the programming comprising instructions for:

detecting a sliding gesture on a touch-sensitive screen of the terminal device, the sliding gesture starting from a non-display area of the touch-sensitive screen and extending to a display area of the touch-sensitive screen, the display area being configured to display an operation interface, the non-display area not being configured to display the operation interface, the non-display area sharing a common border with the display area, and the sliding gesture crossing the common border at a display area entry point; and dynamically scaling the operation interface displayed in the display area down to a scaled operation interface according to a track length of a sliding distance of the sliding gesture, one edge of the scaled operation interface contacting the common border, and the edge of the scaled operation interface comprising the display area entry point.

11. The terminal device of claim 10, wherein the programming further comprises instructions for:

detecting an end point position of the sliding gesture; and performing selection operation on content displayed at the end point position in the display area in response to the detecting the end point position of the sliding gesture.

12. The terminal device of claim 11, wherein the programming further comprises instructions for:

detecting completion of the selection operation; and scaling the scaled operation interface back to the operation interface in response to detecting completion of the selection operation.

13. The terminal device of claim 12, wherein the content displayed at the end point position in the displayed area is one of an icon of an application, a hyperlink address, or a button.

14. The terminal device of claim 12, wherein the selection operation is tapping or double tapping.

15. The terminal device of claim 10, wherein the non-display area shares another common border with the display area, and another edge of the scaled operation interface contacts the other common border.

16. A non-transitory computer-readable medium containing a computer program product comprising executable instructions for processing a gesture received on a terminal device, the terminal device comprising a processor and a touch-sensitive screen coupled to the processor, the touch-sensitive screen configured to cooperate with the processor to display an operation interface, and the executable instructions comprising:

detecting a sliding gesture on a touch-sensitive screen of the terminal device, the sliding gesture starting from a non-display area of the touch-sensitive screen and extending to a display area of the touch-sensitive screen, the display area being configured to display the operation interface, the non-display area not being configured to display the operation interface, the non-display area sharing a common border with the display area, and the sliding gesture crossing the common border at a display area entry point; and dynamically scaling the operation interface displayed in the display area down to a scaled operation interface according to a track length of a sliding distance of the sliding gesture, one edge of the scaled operation interface contacting the common border, and the edge of the scaled operation interface comprising the display area entry point.

17. The non-transitory computer-readable medium of claim 16, wherein the executable instructions further comprise:

detecting an end point position of the sliding gesture; and performing selection operation on content displayed at the end point position in the display area in response to the detecting the end point position of the sliding gesture.

18. The non-transitory computer-readable medium of claim 16, wherein the non-display area shares another common border with the display area, and another edge of the scaled operation interface contacts the other common border.

19. The non-transitory computer-readable medium of claim 17, wherein the executable instructions further comprise:

detecting completion of the selection operation; and scaling the scaled operation interface back to the operation interface in response to detecting completion of the selection operation.

20. The non-transitory computer-readable medium of claim 19, wherein the selection operation is tapping or double tapping.

21. The non-transitory computer-readable medium of claim 17, wherein the content displayed at the end point position in the displayed area is one of an icon of an application, a hyperlink address, or a button.

* * * * *